US011014759B2

(12) United States Patent
Miess et al.

(10) Patent No.: US 11,014,759 B2
(45) Date of Patent: May 25, 2021

(54) ROLLER BALL ASSEMBLY WITH SUPERHARD ELEMENTS

(71) Applicants: David P. Miess, Spring, TX (US); Gregory Prevost, Spring, TX (US); Michael Williams, Houston, TX (US); William W. King, Houston, TX (US); Michael R. Reese, Houston, TX (US)

(72) Inventors: David P. Miess, Spring, TX (US); Gregory Prevost, Spring, TX (US); Michael Williams, Houston, TX (US); William W. King, Houston, TX (US); Michael R. Reese, Houston, TX (US)

(73) Assignee: XR Downhole, LLC, Houston, TX (US)

( * ) Notice: Subject to any disclaimer, the term of this patent is extended or adjusted under 35 U.S.C. 154(b) by 0 days.

(21) Appl. No.: 16/049,631

(22) Filed: Jul. 30, 2018

(65) Prior Publication Data
US 2020/0031586 A1 Jan. 30, 2020

(51) Int. Cl.
*B65G 39/02* (2006.01)
*F16C 29/04* (2006.01)

(52) U.S. Cl.
CPC .......... *B65G 39/025* (2013.01); *F16C 29/046* (2013.01); *F16C 2202/04* (2013.01); *F16C 2206/56* (2013.01); *F16C 2206/60* (2013.01); *F16C 2206/82* (2013.01)

(58) Field of Classification Search
CPC .. B65G 39/025; F16C 29/046; F16C 2202/04; F16C 2206/56; F16C 2206/60; F16C 2206/82; F16C 2326/58
See application file for complete search history.

(56) References Cited

U.S. PATENT DOCUMENTS 1,798,604 A 3/1931 Hoke
1,963,956 A 6/1934 James
2,259,023 A 10/1941 Clark
(Continued)

FOREIGN PATENT DOCUMENTS

CA 2891268 A1 11/2016
JP 06174051 A 6/1994
(Continued)

OTHER PUBLICATIONS

International Search Report and Written Opinion dated Oct. 29, 2019 (issued in PCT Application No. PCT/US2019/043741) [15 pages].
(Continued)

*Primary Examiner* — Gene O Crawford
*Assistant Examiner* — Keith R Campbell
(74) *Attorney, Agent, or Firm* — Michael S. McCoy; Amatong McCoy LLC (57) ABSTRACT

A roller ball assembly is provided. The assembly includes a primary roller ball supported by a support element that is composed of a superhard material. The assembly includes a cup defining a cavity within which the support element is positioned. A cap is coupled with the cup and positioned to retain the primary roller ball within the cavity. Also, a cup is disclosed for supporting roller balls. Additionally, disclosed are system and apparatus incorporating the assembly, as well as to methods of making and using the same.

47 Claims, 8 Drawing Sheets

(56) References Cited

U.S. PATENT DOCUMENTS

| | | |
|---|---|---|
| 2,299,978 A | 10/1942 | Hall |
| 2,407,586 A | 9/1946 | Summers |
| 2,567,735 A | 9/1951 | Scott |
| 2,693,396 A | 11/1954 | Gondek |
| 2,758,181 A | 8/1956 | Crouch |
| 2,788,677 A | 4/1957 | Hayek |
| 2,877,662 A | 3/1959 | Eduard |
| 2,897,016 A | 7/1959 | Baker |
| 2,947,609 A | 8/1960 | Strong |
| 2,947,610 A | 8/1960 | Hall et al. |
| 3,559,802 A | 2/1971 | Eidus |
| 3,582,161 A | 6/1971 | Hudson |
| 3,603,652 A | 9/1971 | Youden |
| 3,650,714 A | 3/1972 | Farkas |
| 3,697,141 A | 10/1972 | Garrett |
| 3,707,107 A | 12/1972 | Bieri |
| 3,741,252 A | 6/1973 | Williams |
| 3,745,623 A | 7/1973 | Wentorf et al. |
| 3,752,541 A | 8/1973 | Mcvey |
| 3,866,987 A | 2/1975 | Garner |
| 3,869,947 A | 3/1975 | Vandenkieboom |
| 3,920,290 A | 11/1975 | Varts |
| 4,085,634 A | 4/1978 | Sattler |
| 4,182,537 A | 1/1980 | Oster |
| 4,225,322 A | 9/1980 | Knemeyer |
| 4,238,137 A | 12/1980 | Furchak et al. |
| 4,285,550 A * | 8/1981 | Blackburn ........... B65G 39/025 16/25 |
| 4,364,136 A | 12/1982 | Hattan |
| 4,398,772 A | 8/1983 | Odell |
| 4,410,054 A | 10/1983 | Nagel et al. |
| 4,410,284 A | 10/1983 | Herrick |
| 4,428,627 A | 1/1984 | Teramachi |
| 4,432,682 A | 2/1984 | McKewan |
| 4,468,138 A | 8/1984 | Nagel |
| 4,554,208 A | 11/1985 | MacIver et al. |
| 4,560,014 A | 12/1985 | Geczy |
| 4,620,601 A | 11/1986 | Nagel |
| RE32,380 E | 3/1987 | Wentorf, Jr. et al. |
| 4,662,348 A | 5/1987 | Hall et al. |
| 4,679,639 A | 7/1987 | Barr et al. |
| 4,689,847 A * | 9/1987 | Huber ................ B65G 39/025 16/24 |
| 4,720,199 A | 1/1988 | Geczy et al. |
| 4,729,440 A | 3/1988 | Hall |
| 4,732,490 A | 3/1988 | Masciarelli |
| 4,764,036 A | 8/1988 | McPherson |
| 4,796,670 A | 1/1989 | Russell et al. |
| 4,797,011 A | 1/1989 | Saeki et al. |
| 4,858,688 A | 8/1989 | Edwards et al. |
| 4,906,528 A | 3/1990 | Cerceau et al. |
| 4,958,692 A | 9/1990 | Anderson |
| 5,011,514 A | 4/1991 | Cho et al. |
| 5,011,515 A | 4/1991 | Frushour |
| 5,030,276 A | 7/1991 | Sung et al. |
| 5,037,212 A | 8/1991 | Justman et al. |
| 5,066,145 A | 11/1991 | Sibley et al. |
| 5,067,826 A | 11/1991 | Lemelson |
| 5,092,687 A | 3/1992 | Hall |
| 5,112,146 A | 5/1992 | Stangeland |
| 5,123,772 A | 6/1992 | Anderson |
| 5,151,107 A | 9/1992 | Cho et al. |
| 5,176,483 A | 1/1993 | Baumann et al. |
| 5,193,363 A | 3/1993 | Petty |
| 5,205,188 A | 4/1993 | Repenning et al. |
| 5,253,939 A | 10/1993 | Hall |
| 5,271,749 A | 12/1993 | Rai et al. |
| 5,351,770 A | 10/1994 | Cawthorne et al. |
| 5,358,041 A | 10/1994 | O'Hair |
| 5,358,337 A | 10/1994 | Codatto |
| 5,375,679 A | 12/1994 | Biehl |
| 5,385,715 A | 1/1995 | Fish |
| 5,447,208 A | 9/1995 | Lund et al. |
| 5,462,362 A | 10/1995 | Yuhta et al. |
| 5,464,086 A | 11/1995 | Coelln |
| 5,522,467 A | 6/1996 | Stevens et al. |
| 5,533,604 A | 7/1996 | Brierton |
| 5,538,346 A | 7/1996 | Frias et al. |
| 5,540,314 A * | 7/1996 | Coelln ................ B65G 39/025 193/35 MD |
| 5,560,716 A | 10/1996 | Tank et al. |
| 5,618,114 A | 4/1997 | Katahira |
| 5,645,617 A | 7/1997 | Frushour |
| 5,653,300 A | 8/1997 | Lund et al. |
| 5,715,898 A | 2/1998 | Anderson |
| 5,833,019 A | 11/1998 | Gynz-Rekowski |
| 5,855,996 A | 1/1999 | Corrigan et al. |
| 5,948,541 A | 9/1999 | Inspektor |
| 6,109,790 A | 8/2000 | Gynz-Rekowski et al. |
| 6,120,185 A | 9/2000 | Masciarelli, Jr. |
| 6,129,195 A | 10/2000 | Matheny |
| 6,152,223 A | 11/2000 | Abdo et al. |
| 6,164,109 A | 12/2000 | Bartosch |
| 6,279,716 B1 | 8/2001 | Kayatani et al. |
| 6,378,633 B1 | 4/2002 | Moore et al. |
| 6,409,388 B1 * | 6/2002 | Lin ........................ B60B 33/08 16/29 |
| 6,457,865 B1 | 10/2002 | Masciarelli, Jr. |
| 6,488,103 B1 | 12/2002 | Dennis et al. |
| 6,488,715 B1 | 12/2002 | Pope et al. |
| 6,516,934 B2 | 2/2003 | Masciarelli, Jr. |
| 6,652,201 B2 | 11/2003 | Kunimori et al. |
| 6,655,845 B1 * | 12/2003 | Pope ..................... A61L 27/303 384/492 |
| 6,737,377 B1 | 5/2004 | Sumiya et al. |
| 6,764,219 B2 * | 7/2004 | Doll ....................... C23C 30/00 384/565 |
| 6,808,019 B1 | 10/2004 | Mabry |
| 6,814,775 B2 | 11/2004 | Scurlock et al. |
| 6,951,578 B1 | 10/2005 | Belnap et al. |
| 7,007,787 B2 | 3/2006 | Pallini et al. |
| 7,198,043 B1 | 4/2007 | Zhang |
| 7,441,610 B2 | 10/2008 | Belnap et al. |
| 7,475,744 B2 | 1/2009 | Pope |
| 7,552,782 B1 | 6/2009 | Sexton et al. |
| 7,703,982 B2 | 4/2010 | Cooley |
| 7,737,377 B1 | 6/2010 | Dodal et al. |
| 7,845,436 B2 | 12/2010 | Cooley et al. |
| 7,861,805 B2 | 1/2011 | Dick et al. |
| 8,069,933 B2 | 12/2011 | Sexton et al. |
| 8,109,247 B2 | 2/2012 | Wakade et al. |
| 8,119,240 B2 | 2/2012 | Cooper |
| 8,163,232 B2 | 4/2012 | Fang et al. |
| 8,277,722 B2 | 10/2012 | DiGiovanni |
| 8,365,846 B2 | 2/2013 | Dourfaye et al. |
| 8,485,284 B2 | 7/2013 | Sithebe |
| 8,613,554 B2 | 12/2013 | Tessier et al. |
| 8,627,904 B2 | 1/2014 | Voronin |
| 8,678,657 B1 | 3/2014 | Knuteson et al. |
| 8,701,797 B2 | 4/2014 | Baudoin |
| 8,734,550 B1 | 5/2014 | Sani |
| 8,757,299 B2 | 6/2014 | DiGiovanni et al. |
| 8,763,727 B1 | 7/2014 | Cooley et al. |
| 8,764,295 B2 | 7/2014 | Dadson et al. |
| 8,881,849 B2 | 11/2014 | Shen et al. |
| 8,939,652 B2 | 1/2015 | Peterson et al. |
| 8,974,559 B2 | 3/2015 | Frushour |
| 9,004,198 B2 | 4/2015 | Kulkarni |
| 9,010,418 B2 | 4/2015 | Pereyra et al. |
| 9,045,941 B2 | 6/2015 | Chustz |
| 9,103,172 B1 | 8/2015 | Bertagnolli et al. |
| 9,127,713 B1 | 9/2015 | Lu |
| 9,145,743 B2 | 9/2015 | Shen et al. |
| 9,222,515 B2 | 12/2015 | Chang |
| 9,273,381 B2 | 3/2016 | Qian et al. |
| 9,366,085 B2 | 6/2016 | Panahi |
| 9,404,310 B1 | 8/2016 | Sani et al. |
| 9,410,573 B1 | 8/2016 | Lu |
| 9,429,188 B2 | 8/2016 | Peterson et al. |
| 9,488,221 B2 | 11/2016 | Gonzalez |
| 9,562,562 B2 | 2/2017 | Peterson |
| 9,643,293 B1 | 5/2017 | Miess et al. |
| 9,702,401 B2 | 7/2017 | Gonzalez |
| 9,732,791 B1 | 8/2017 | Gonzalez |

(56) References Cited

U.S. PATENT DOCUMENTS

| | | |
|---|---|---|
| 9,776,917 B2 | 10/2017 | Tessitore et al. |
| 9,790,749 B2 | 10/2017 | Chen |
| 9,790,818 B2 | 10/2017 | Berruet et al. |
| 9,803,432 B2 | 10/2017 | Wood et al. |
| 9,822,523 B1 | 11/2017 | Miess |
| 9,840,875 B2 | 12/2017 | Harvey et al. |
| 9,869,135 B1 | 1/2018 | Martin |
| 10,113,362 B2 | 10/2018 | Ritchie et al. |
| 10,294,986 B2 | 5/2019 | Gonzalez |
| 10,307,891 B2 | 6/2019 | Daniels et al. |
| 10,408,086 B1 | 9/2019 | Meier |
| 10,465,775 B1 | 11/2019 | Miess et al. |
| 10,683,895 B2 | 6/2020 | Hall et al. |
| 10,738,821 B2 | 8/2020 | Miess et al. |
| 10,807,913 B1 | 10/2020 | Hawks et al. |
| 2002/0020526 A1 | 2/2002 | Male et al. |
| 2003/0019106 A1 | 1/2003 | Pope et al. |
| 2003/0159834 A1 | 8/2003 | Kirk et al. |
| 2004/0031625 A1 | 2/2004 | Lin et al. |
| 2004/0219362 A1 | 11/2004 | Wort et al. |
| 2004/0223676 A1 | 11/2004 | Pope et al. |
| 2006/0060392 A1 | 3/2006 | Eyre |
| 2006/0165973 A1 | 7/2006 | Dumm et al. |
| 2007/0046119 A1 | 3/2007 | Cooley |
| 2008/0217063 A1 | 9/2008 | Moore et al. |
| 2008/0253706 A1 | 10/2008 | Bischof et al. |
| 2009/0020046 A1 | 1/2009 | Marcelli |
| 2009/0087563 A1 | 4/2009 | Voegele et al. |
| 2010/0037864 A1 | 2/2010 | Dutt et al. |
| 2010/0276200 A1 | 11/2010 | Schwefe et al. |
| 2010/0307069 A1 | 12/2010 | Bertagnolli et al. |
| 2011/0203791 A1 | 8/2011 | Jin et al. |
| 2011/0220415 A1 | 9/2011 | Jin et al. |
| 2011/0297454 A1 | 12/2011 | Shen et al. |
| 2012/0037425 A1 | 2/2012 | Sexton et al. |
| 2012/0057814 A1 | 3/2012 | Dadson et al. |
| 2012/0225253 A1 | 9/2012 | DiGiovanni et al. |
| 2012/0281938 A1 | 11/2012 | Peterson et al. |
| 2013/0000442 A1 | 1/2013 | Wiesner et al. |
| 2013/0004106 A1 | 1/2013 | Wenzel |
| 2013/0146367 A1 | 6/2013 | Zhang et al. |
| 2013/0170778 A1 | 7/2013 | Higginbotham et al. |
| 2014/0254967 A1 | 9/2014 | Gonzalez |
| 2014/0355914 A1 | 12/2014 | Cooley et al. |
| 2015/0027713 A1 | 1/2015 | Penisson |
| 2015/0132539 A1 | 5/2015 | Bailey et al. |
| 2016/0153243 A1 | 6/2016 | Hinz et al. |
| 2016/0312535 A1 | 10/2016 | Ritchie et al. |
| 2017/0030393 A1 | 2/2017 | Phua et al. |
| 2017/0138224 A1 | 5/2017 | Henry et al. |
| 2017/0234071 A1 | 8/2017 | Spatz et al. |
| 2018/0087134 A1 | 3/2018 | Chang et al. |
| 2018/0209476 A1 | 7/2018 | Gonzalez |
| 2018/0264614 A1 | 9/2018 | Winkelmann et al. |
| 2019/0063495 A1 | 2/2019 | Peterson et al. |
| 2019/0170186 A1 | 6/2019 | Gonzalez et al. |
| 2020/0032841 A1 | 1/2020 | Miess et al. |
| 2020/0032846 A1 | 1/2020 | Miess et al. |
| 2020/0056659 A1 | 2/2020 | Prevost et al. |
| 2020/0182290 A1 | 6/2020 | Doehring et al. |

FOREIGN PATENT DOCUMENTS

| | | |
|---|---|---|
| WO | 2004001238 A2 | 12/2003 |
| WO | 2006028327 A1 | 3/2006 |
| WO | 2017105883 A1 | 6/2017 |
| WO | 2018041578 A1 | 3/2018 |
| WO | 2018226380 A1 | 12/2018 |
| WO | 2019096851 A1 | 5/2019 |

OTHER PUBLICATIONS

International Search Report and Written Opinion dated Oct. 21, 2019 (issued in PCT Application No. PCT/US2019/043746) [14 pages].

International Search Report and Written Opinion dated Oct. 22, 2019 (issued in PCT Application No. PCT/US2019/043744) [11 pages].

International Search Report and Written Opinion dated Oct. 25, 2019 (issued in PCT Application No. PCT/US2019/044682) [20 pages].

International Search Report and Written Opinion dated Sep. 9, 2019 (issued in PCT Application No. PCT/US2019/043732) [10 pages].

Bovenkerk, DR. H. P.; Bundy, DR. F. P.; Hall, DR. H. T.; Strong, DR. H. M.; Wentorf, Jun., DR. R. H.; Preparation of Diamond, Nature, Oct. 10, 1959, pp. 1094-1098, vol. 184.

Chen, Y.; Nguyen, T; Zhang, L.C.; Polishing of polycrystalline diamond by the technique of dynamic friction—Part 5: Quantitative analysis of material removal, International Journal of Machine Tools & Manufacture, 2009, pp. 515-520, vol. 49, Elsevier.

Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine Tools & Manufacture, 2006, pp. 580-587, vol. 46, Elsevier.

Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.

Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.

Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.

Dobrzhinetskaya, Larissa F.; Green, II, Harry W.; Diamond Synthesis from Graphite in the Presence of Water and SiO2: Implications for Diamond Formation in Quartzites from Kazakhstan, International Geology Review, 2007, pp. 389-400, vol. 49.

Liao, Y.; Marks, L.; In situ single asperity wear at the nanometre scale, International Materials Reviews, 2016, pp. 1-17, Taylor & Francis.

Machinery's Handbook 30th Edition, Copyright Page and Coefficients of Friction Page, 2016, p. 158 (2 pages total), Industrial Press, Inc., South Norwalk, U.S.A.

McCarthy, J. Michael; Cam and Follower Systems, PowerPoint Presentation, Jul. 25, 2009, pp. 1-14, UCIrvine The Henry Samueli School of Engineering.

McGill Cam Follower Bearings brochure, 2005, p. 1-19, Back Page, Brochure MCCF-05, Form #8991 (20 Pages total).

Motion & Control NSK Cam Followers (Stud Type Track Rollers) Roller Followers (Yoke Type Track Rollers) catalog, 1991, Cover Page, pp. 1-18, Back Page, CAT. No. E1421 2004 C-11, Japan.

RBC Aerospace Bearings Rolling Element Bearings catalog, 2008, Cover Page, First Page, pp. 1-149, Back Page (152 Pages total).

Sandvik Coromant Hard part turning with CBN catalog, 2012, pp. 1-42, 2 Back Pages (44 Pages total).

Sexton, Timothy N.; Cooley, Craig H.; Diamond Bearing Technology for Deep and Geothermal Drilling, PowerPoint Presentation, 2010, 16 Pages.

SKF Ball transfer units catalog, Dec. 2006, Cover Page, Table of Contents, pp. 1-36, 2 Back Pages (40 Pages total), Publication 940-711.

Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).

Sun, Liling; Wu, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.

United States Defensive Publication No. T102,901, published Apr. 5, 1983, in U.S. Appl. No. 298,271 [2 Pages].

(56) References Cited

OTHER PUBLICATIONS

USSynthetic Bearings and Waukesha Bearings brochure for Diamond Tilting Pad Thrust Bearings, 2015, 2 Pages.
Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.
Hudson Bearings Air Cargo Ball Transfers brochure, accessed on Jun. 23, 2018, 8 Pages, Columbus, Ohio.
Hudson Bearings Air Cargo Ball Transfers Installation and Maintenance Protocols, accessed on Jun. 23, 2018, pp. 1-5.
Product Catalogue, Asahi Diamond Industrial Australia Pty. Ltd., accessed on Jun. 23, 2018, Cover Page, Blank Page, 2 Notes Pages, Table of Contents, pp. 1-49 (54 Pages total).
RGPBalls Ball Transfer Units catalog, accessed on Jun. 23, 2018, pp. 1-26, 2 Back Pages (28 Pages total).
USSynthetic Bearings brochure, accessed on Jun. 23, 2018, 12 Pages, Orem, Utah.
Zhigadlo, N. D., Spontaneous growth of diamond from MnNi solvent-catalyst using opposed anvil-type high-pressure apparatus, accessed on Jun. 28, 2018, pp. 1-12, Laboratory for Solid State Physics, Switzerland.
Linear Rolling Bearings ME EN 7960—Precision Machine Design Topic 8, Presentation, Accessed on Jan. 26, 2020, 23 Pages, University of Utah.
Linear-motion Bearing, Wikipedia, https://en.wikipedia.org/w/index.php?title=Linear-motion_bearing&oldid=933640111, Jan. 2, 2020, 4 Pages.
Element six, The Element Six CVD Diamond Handbook, Accessed on Nov. 1, 2019, 28 pages.
Grossman, David, What the World Needs Now is Superhard Carbon, Popular Mechanics, https://www.popularmechanics.com/science/environment/a28970718/superhard-materials/,Sep. 10, 2019, 7 pages, Hearst Magazine Media, Inc.
Machinery's Handbook, 2016, Industrial Press, Inc., 30th edition, pp. 843 and 1055 (6 pages total).
Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.
Surface Finish, Wikipedia, https://en.wikipedia.org/wiki/Surface_finish,Retrieved from https://en.wikipedia.org/w/index.php?title=Surface_finish&oldid=919232937, Oct. 2, 2019, 3 pages.
Zeidan, Fouad Y.; Paquette, Donald J., Application of High Speed and High Performance Fluid Film Bearings in Rotating Machinery, 1994, pp. 209-234.
International Search Report and Written Opinion dated Aug. 3, 2020 (issued in PCT Application No. PCT/US20/21549) [11 pages].
International Search Report and Written Opinion dated Aug. 4, 2020 (issued in PCT Application No. PCT/US2020/034437) [10 pages].
International Search Report and Written Opinion dated Sep. 2, 2020 (issued in PCT Application No. PCT/US20/37048) [8 pages].
International Search Report and Written Opinion dated Sep. 8, 2020 (issued in PCT Application No. PCT/US20/35316) [9 pages].
International Search Report and Written Opinion dated Sep. 9, 2020 (issued in PCT Application No. PCT/US20/32196) [13 pages].

* cited by examiner

Figure 1

Prior Art

ROLLER BALL ASSEMBLY WITH SUPERHARD ELEMENTS

CROSS-REFERENCE TO RELATED APPLICATIONS

The present application is related to U.S. patent application Ser. No. 15/430,254 entitled Drilling Machine, filed Feb. 10, 2017 and assigned to the same assignee as the present application and which is incorporated herein in its entirety as if set out in full. The present application is also related to: the concurrently filed U.S. patent application Ser. No. 16/049,608 entitled "Polycrystalline Diamond Radial Bearing"; the concurrently filed U.S. patent application Ser. No. 16/049,588 entitled "Cam Follower with Polycrystalline Diamond Engagement Element"; and the concurrently filed U.S. patent application Ser. No. 16/049,617 entitled "Polycrystalline Diamond Thrust Bearing and Element Thereof", each of which is assigned to the same assignee as the present application and is incorporated herein by reference in its entirety as if set out in full.

STATEMENT REGARDING FEDERALLY SPONSORED RESEARCH OF DEVELOPMENT

Not applicable.

FIELD

The present disclosure relates to roller ball assemblies, apparatus and systems including the same, and methods of making, assembling, and using the same.

BACKGROUND

Roller ball assemblies, also known as transfer ball bearings, are employed extensively in material handling and equipment applications. Such applications include but are not limited to: equal load distribution, aerospace & air cargo applications, die-handling, metal manufacturing & fabrication, caster substitution, medical technologies & devices, industrial robotics, downhole drilling tools, downhole wireline operations, downhole coiled tubing operations, downhole completions, military logistics, measuring equipment, guides for small linear motion (e.g., photo copier slides), and transfer of material in clean rooms.

Roller ball assemblies typically include a primary ball supported by a multiplicity of smaller ball bearings in a containing cup. Typical comparative sizes are 1", or 1¼", or 1½" diameter for the primary roller ball and ⅛" diameter for the support balls. Over time, the primary roller ball and especially the support balls are subject to point loading, surface spalling, corrosion, and fatigue loading, leading to failure of the roller ball assembly. Some precision applications employ primary balls as small as 4.8 mm and appropriately reduced diameter support balls.

Figure 1:
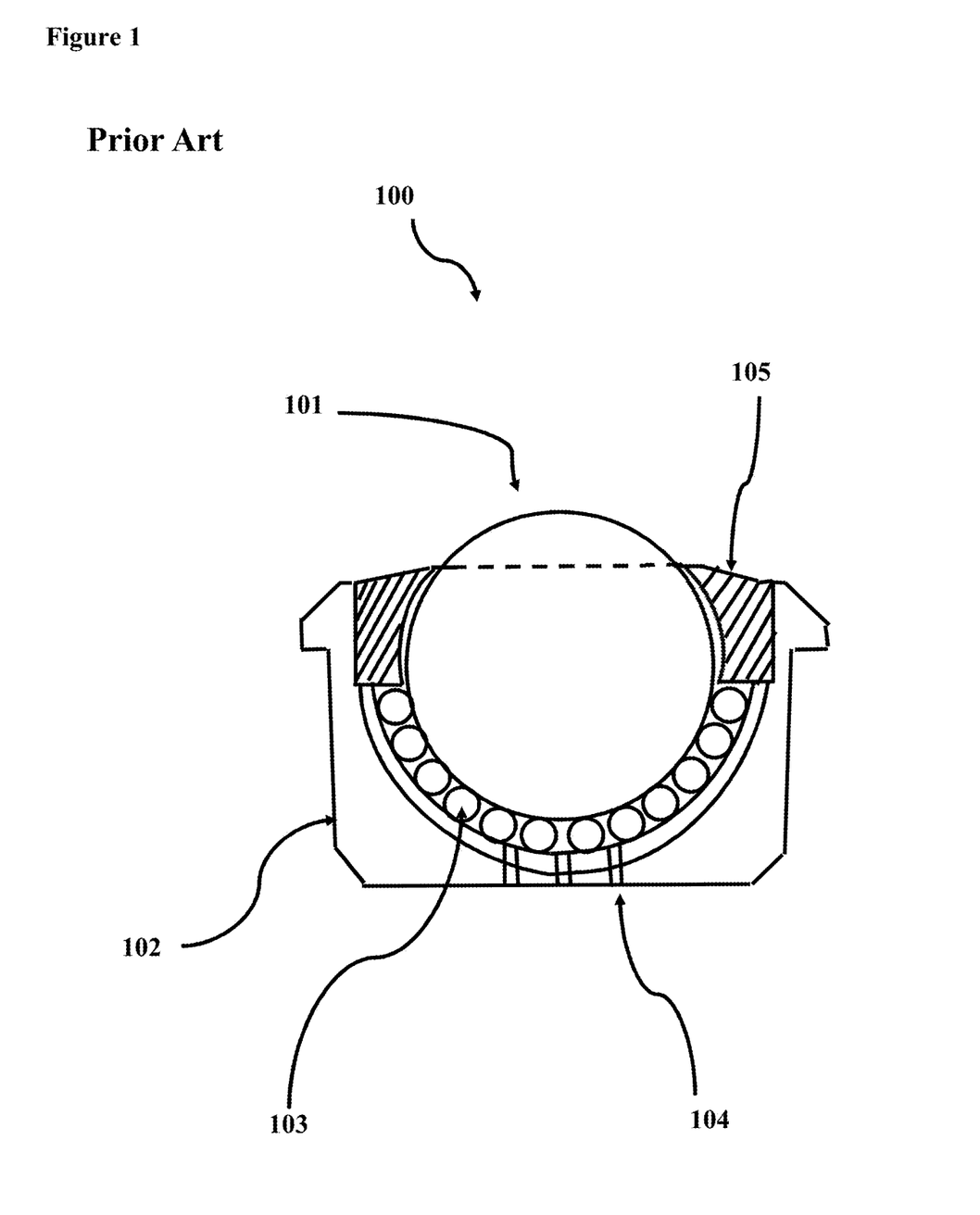
FIG. 1 is a cross-sectional view of a typical roller ball assembly of the prior art.

FIG. 1 depicts a cross-sectional view of a typical roller ball assembly 100 of the prior art. In assembly 100, primary roller ball 101 is supported by a series of small steel balls 103 within shaped steel cup 102. Primary steel roller ball 101 is retained by cap 105. Assembly 100 also includes small weep holes 104 for clearing liquid or minor debris.

Some assemblies do not employ smaller ball bearings as support for the primary roller ball, but rather use a direct engagement with a cup surface. In order to overcome galling problems, these designs have, in some instances, used coatings or lubricants, which require seals, or alternative roller ball materials, such as silicon nitride, tungsten carbide, silicon carbide, or ceramics. Even when coatings or alternative roller ball materials are used, the increased surface contact area of the roller ball with the cup surface increases the coefficient of friction and reduces the free rolling capability of the roller ball.

An additional significant challenge is contamination with debris, hampering the free rolling of the primary roller ball. In the support ball of existing assemblies, debris evacuation openings in the lower cup structure must be small enough to not catch or interfere with the free rolling of the secondary balls. This size limitation of the debris evacuation openings limits their effectiveness in clearing contaminants from the assembly.

Changing out failed or fouled roller ball assemblies is time consuming and disruptive to operations. This can be especially problematic in aerospace, downhole, and military logistics operations where limited access exists or failure impacts mission critical performance.

Information on roller ball bearing assemblies can be found in the "Hudson Bearings Air Cargo Roller Ball Transfers", an undated eight-page brochure, as well as in "Hudson Bearings Air Cargo Roller Ball Transfers Installation and Maintenance Protocols", an undated five-page brochure, both of which are available from the Hudson Bearings website (www.hudsonbearings.com). Of note from these brochures are the 850 lbs. maximum load capacity rating and 400° F. maximum temperature range for heavy duty transfer roller ball assemblies.

An additional reference on the downhole use of roller ball assemblies is U.S. Pat. No. 9,803,432, to Wood et al., which is incorporated herein by reference in its entirety as if set out in full.

BRIEF SUMMARY

Some aspects of the present disclosure include a roller ball assembly. The assembly includes a primary roller ball that is supported by at least one support element. Each support element is composed of a superhard material.

Other aspects of the present disclosure include a cup for supporting a roller ball in a roller ball assembly. The cup includes a cup body defining a cavity. At least one support element is positioned in the cavity and coupled with the cup body. Each support element is composed of a superhard material.

Additional aspects of the present disclosure include a method of supporting a primary roller ball of a roller ball assembly. The method includes positioning at least one support element within a cavity of a cup. Each support element is composed of a superhard material. The method includes positioning the primary roller ball within the cavity such that an outer surface of the primary roller ball is in contact with an engagement surface of the at least one support element. The method includes positioning a cap relative to the cup such that the cap is positioned to retain the primary roller ball within the cavity.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain aspects of the present disclosure include roller ball assemblies, apparatus including roller ball assemblies, systems including roller ball assemblies, methods of making roller ball assemblies, methods of assembling roller ball assemblies, and methods of using roller ball assemblies.
Roller Ball Assemblies Including Superhard Materials In some embodiments, the technology of this application provides for a high-performance roller ball assembly with a moving part (optionally a single moving part), in particular a primary roller ball, supported on at least one so called "superhard" component or element (i.e., a component composed of a "superhard material"). As would be understood by one skilled in the art, "superhard materials" are a category of materials defined by the hardness of the material, which may be determined in accordance with the Brinell, Rockwell, Knoop and/or Vickers scales. For example, superhard materials include materials with a hardness value exceeding 40 gigapascals (GPa) when measured by the Vickers hardness test. As used herein, superhard materials include materials that are at least as hard as tungsten carbide tiles and/or cemented tungsten carbide, such as is determined in accordance with one of these hardness scales, such as the Brinell scale. One skilled in the art would understand that a Brinell scale test may be performed, for example, in accordance with ASTM E10-14; the Vickers hardness test may be performed, for example, in accordance with ASTM E384; the Rockwell hardness test may be performed, for example, in accordance with ASTM E18; and the Knoop hardness test may be performed, for example, in accordance with ASTM E384. The "superhard materials" disclosed herein include, but are not limited to, tungsten carbide (e.g., tile or cemented), infiltrated tungsten carbide matrix, silicon carbide, silicon nitride, cubic boron nitride, and polycrystalline diamond.

Thus, some aspects of the present disclosure include employing discrete superhard elements to support a roller ball. In certain aspects of the technology of this application, the need for small diameter support balls in a roller ball assembly is eliminated. Thus, at least some of the roller ball assemblies disclosed herein lack (i.e., do not include) small diameter support balls.

In certain embodiments, the roller ball assemblies disclosed herein have a higher load bearing capacity, higher temperature capacity, are more durable, are more corrosion resistant, are smoother running, and have a greater capacity for the passing of contaminants and larger debris from the working area of the assembly in comparison to existing roller ball assemblies.

In some aspects, the roller ball assemblies disclosed herein "self-clean" any corrosion on the primary roller ball. As the surface of the primary roller ball moves, while engaged with the surface of the polycrystalline diamond elements, existing corrosion on the primary roller ball may be at least partially removed therefrom via the frictional forces resulting from the engagement between the surfaces of the primary roller ball and the polycrystalline diamond elements. That is, the polycrystalline diamond elements clean, sweep, or rub off at least some of the corroded material of the primary roller ball. In contrast, roller ball assemblies such as is shown in FIG. 1 include primary roller balls that "roll" on other, small roller balls, which do not function to remove corroded material from the primary roller ball.

In certain embodiments, the technology of this application includes a roller ball assembly suitable for application in harsh environments (e.g., downhole environments). The technology of this application includes a roller ball assembly capable of application in downhole drilling applications in the mitigation of torque and drag.
Exemplary Testing Applicants of the present application have conducted significant testing on an exemplary roller ball assembly that provides an ultra-high-performance alternative in comparison to existing technology. Table 1, below, sets forth a summary of a test performed by the Applicants of an exemplary configuration of a roller ball assembly of the present disclosure.

TABLE 1

| Tested Mechanism - Bearing Steel Ball in Alloy Steel Cup Against Rotating Steel Cam Surface | | RPM | Surface Speed | Loading | Result |
| --- | --- | --- | --- | --- | --- |
| Test | Tripod Polished PDC 1.50" Ball | 200 | 1.13 m/s | 700 lbf | 20 hr. test, little wear on Ball; slight Hertzian trace on PDCs |

Figure 2:
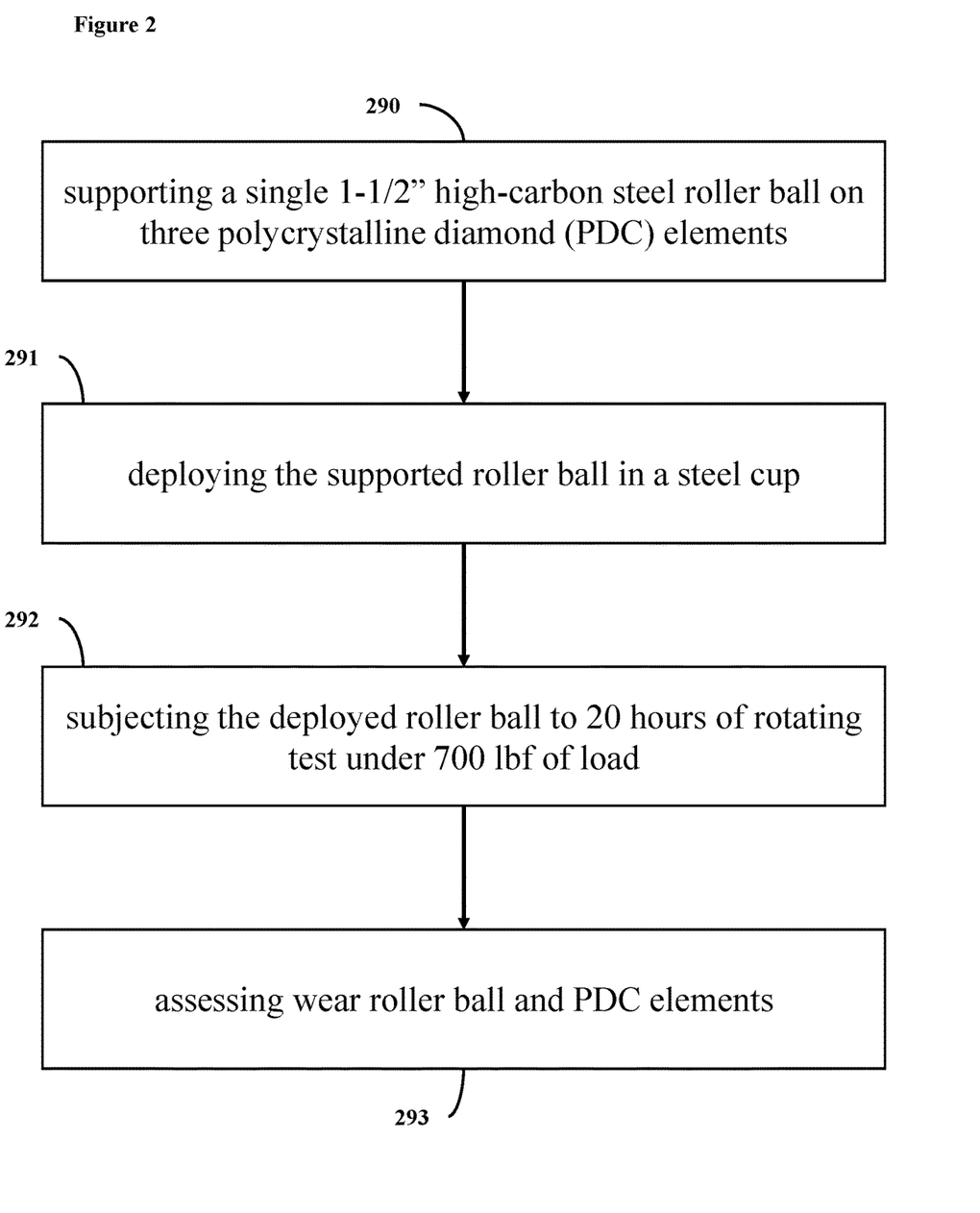
FIG. 2 is a flow chart of a method in accordance with certain aspects of the present disclosure.

FIG. 2 sets forth the steps of the testing performed, which included: supporting a single 1½" high-carbon steel roller ball on three polycrystalline diamond (PDC) elements, box 290; deploying the supported roller ball in a steel cup, box 291; subjecting the deployed roller ball to 20 hours of rotating test under 700 lbf of load, box 292; and assessing wear roller ball and PDC elements, box 293. As is evident from Table 1, the testing resulted in little wear on the roller ball and only a slight Hertzian trace of discoloration on the PDC elements.

In further testing, 800 lbs of load on the primary roller ball of a prior art roller ball assembly was found to produce 525,000 PSI max stress on the associated support ball. Whereas, in an exemplary roller ball assembly in accordance with the present disclosure, 1,600 lbs of load on the primary roller ball was required to produce the same 525,000 PSI max stress on the associated superhard element. Consequently, without being bound by theory, the technology disclosed herein exhibited twice the load bearing capacity in comparison to the prior art roller ball assembly.

Turning now to FIGS. 3-8, various exemplary roller ball assemblies and aspects thereof will now be described. In FIGS. 3-8, like reference numerals refer to like elements. For example, an exemplary cup is identified with reference numeral "302" in FIG. 3 and is identified with reference numeral "402" in FIG. 4.

Roller Ball Assembly with Superhard Support Elements

Figure 3:
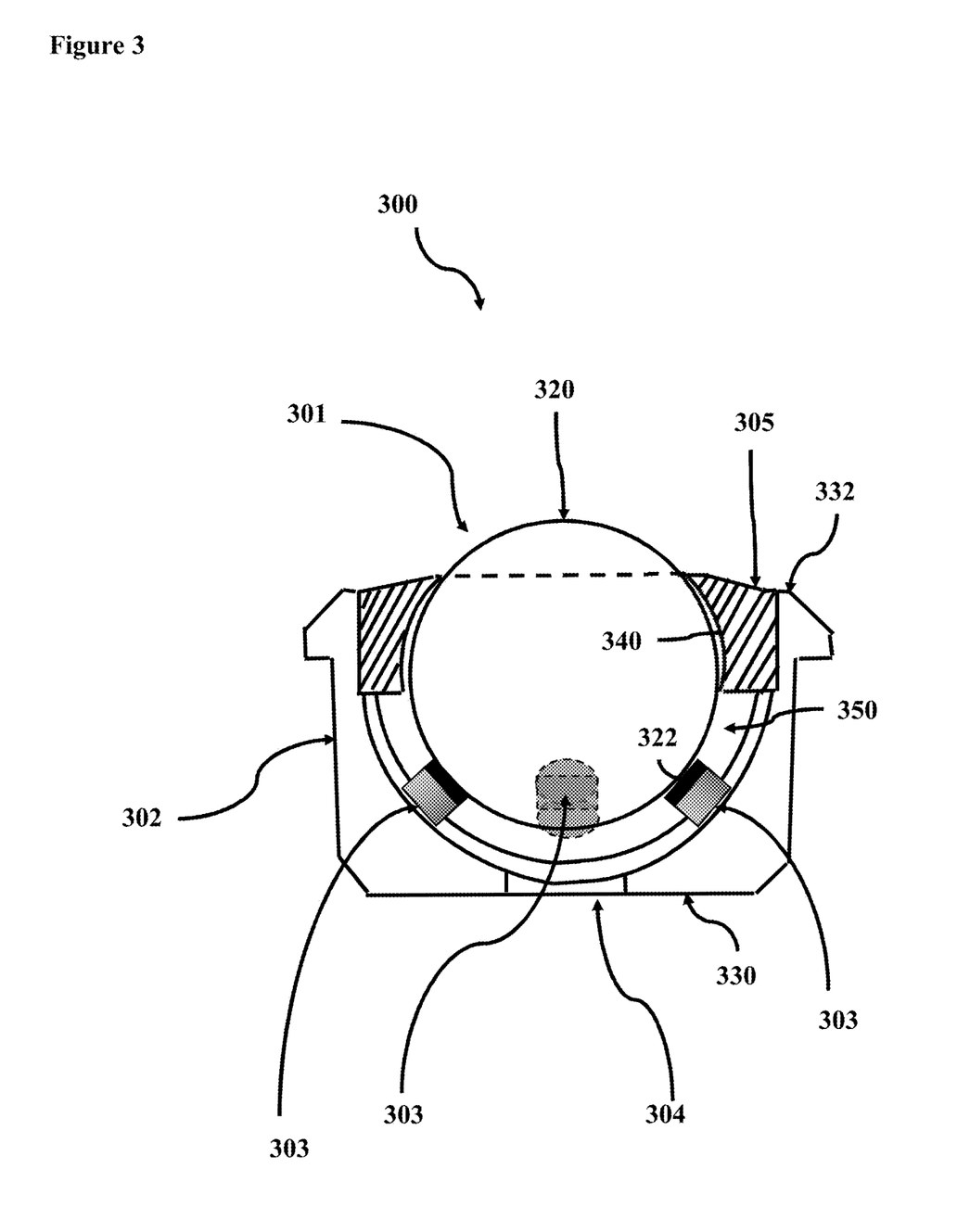
FIG. 3 is a side view of an embodiment of a roller ball assembly of the present application.

FIG. 3 is a side view of a roller ball assembly 300 in accordance with an embodiment of the present application. In assembly 300, roller ball 301 is supported within cup 302 (cup body) via support elements 303. Each support element 303 is formed of a superhard material. Roller ball 301 may be formed of any of a variety of materials including, but not limited to, steel. As shown in FIG. 3, roller ball 301 is supported by support elements 303 via contact between roller ball outer surface 320 (also referred to as engagement surface) and support element surfaces 322 (also referred to as opposing engagement surfaces). Primary roller ball 301 is clear of (i.e., not in contact with) cup 302. Support elements 303 are attached to, embedded within, or otherwise affixed to and/or coupled with or within cup 302. In contrast to small support roller balls, such as is shown in FIG. 1, support elements 303 are static relative to cup 302. In operation, primary roller ball 301 moves in sliding contact with support elements 303.

Cup 302, also referred to as "shaped cup", has a shape that defines a cavity 350 configured to receive roller ball 301 therein, and to allow rolling of roller ball 301 therein. Cup 302 may be formed on any of a variety of materials including, but not limited to, steel.

Assembly 300 includes cap 305. Cap 305 is positioned relative to cup 302 to retain primary roller ball 301 within cup 302. Cap 305 is engaged and/or coupled (e.g., affixed) with cup 302 at top end 332 of cup 302. Cap 305 has a curvature 340 sufficient to retain roller ball 301 within cup 302 such that, in operation, roller ball 301 is supported via support elements 303 and freely rolls within cup 302 while being retained therein by cap 305. Cap 305 is clear of (i.e., not in contact with) primary roller ball 301. Cap 305 may be formed on any of a variety of materials including, but not limited to, steel. Cap 305 may be, for example, in the form of a retainer ring.

Assembly 300 includes debris clearance hole 304 positioned at the bottom end 330 of cup 302. Hole 304 may be sized and arranged for clearance of large debris from cup 302. Contrary to the hole 204 of FIG. 1, hole 304 is not limited in size by the presence of small supporting roller balls that would fall through the hole if the hole were too large. Thus, while hole 304 may be as small or smaller than hole 204, hole 304 may also be larger, even significantly larger, than hole 204. For example, hole 304 may be up to about half the size of primary roller ball 301 (e.g., half the diameter), or from about ⅛ to about ½ the size (e.g., diameter) of primary roller ball 301, or from about ¼ to about ½ the size (e.g., diameter) of primary roller ball 301.

One skilled in the art would understand that the roller ball assembly disclosed herein is not limited to the particular arrangement shown in FIG. 3 (or FIGS. 4-8). For example, the roller ball assembly may include more or less than three support elements, which may be arranged, sized, and positioned in numerous configurations.

Cup Assembly

Figure 4:
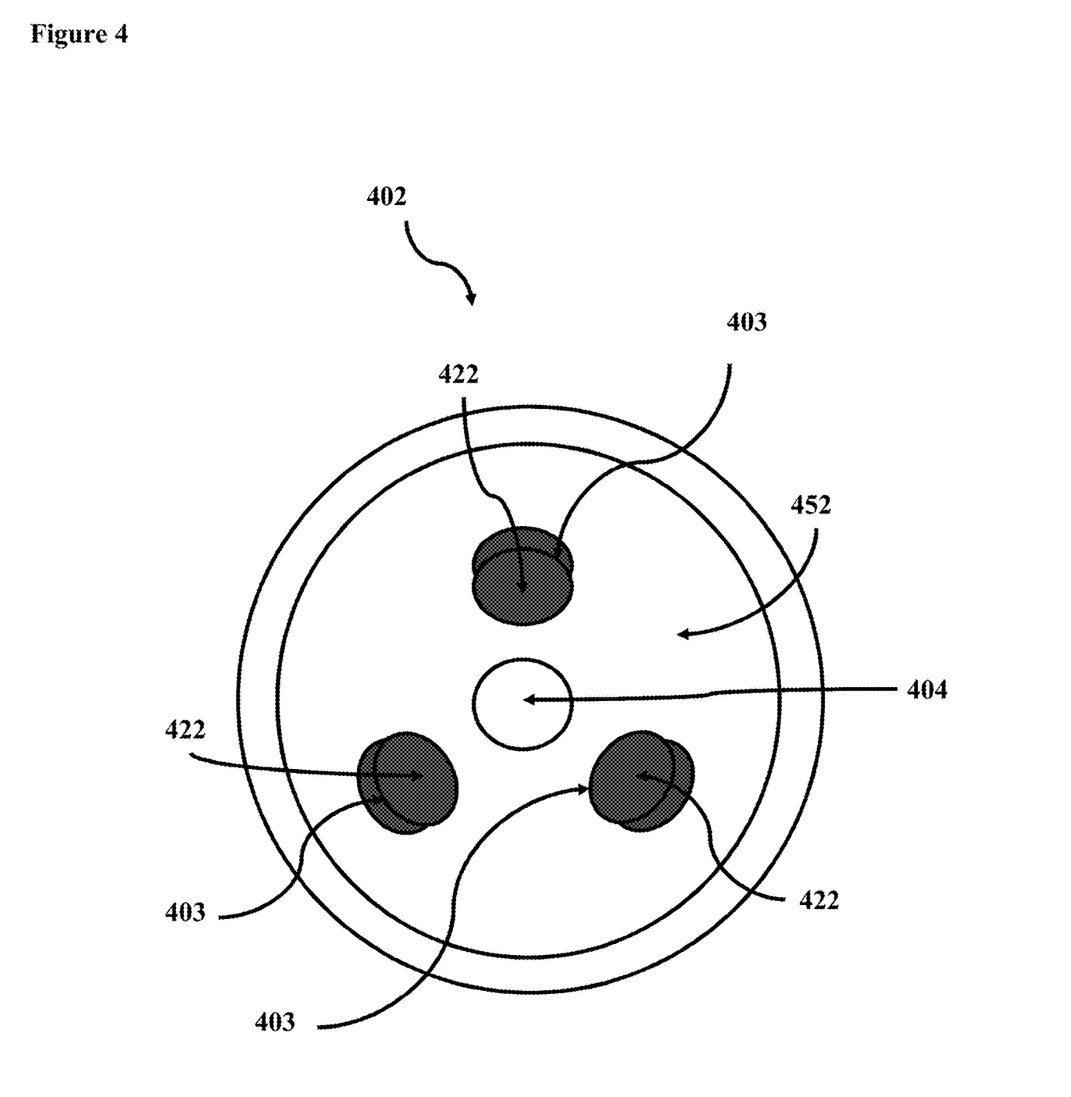
FIG. 4 is a top view of a cup of a three-support element assembly of the present technology without roller ball or cap.

FIG. 4 is a top view of a cup that includes a three-support element assembly (i.e., three support elements, 403) in accordance with certain aspects of the present technology. Cup 402 is shown in FIG. 4 without a roller ball engaged therein and without a cap engaged thereon.

Support elements 403, formed of a superhard material, are deployed and positioned within cup 402. Support elements 403 may be coupled to, with, or within cavity surface 452 of cup 402 via any of a variety of methods, as is known in the art. Debris clearance hole 404 is positioned at the bottom end of cup 402, as a through-hole through cavity surface 452.

While shown as evenly spaced in FIG. 4, one skilled in the art would understand that support elements 403 may be spaced unevenly.

Roller Ball Assembly with Superhard Support and Retention Elements

Figure 5:
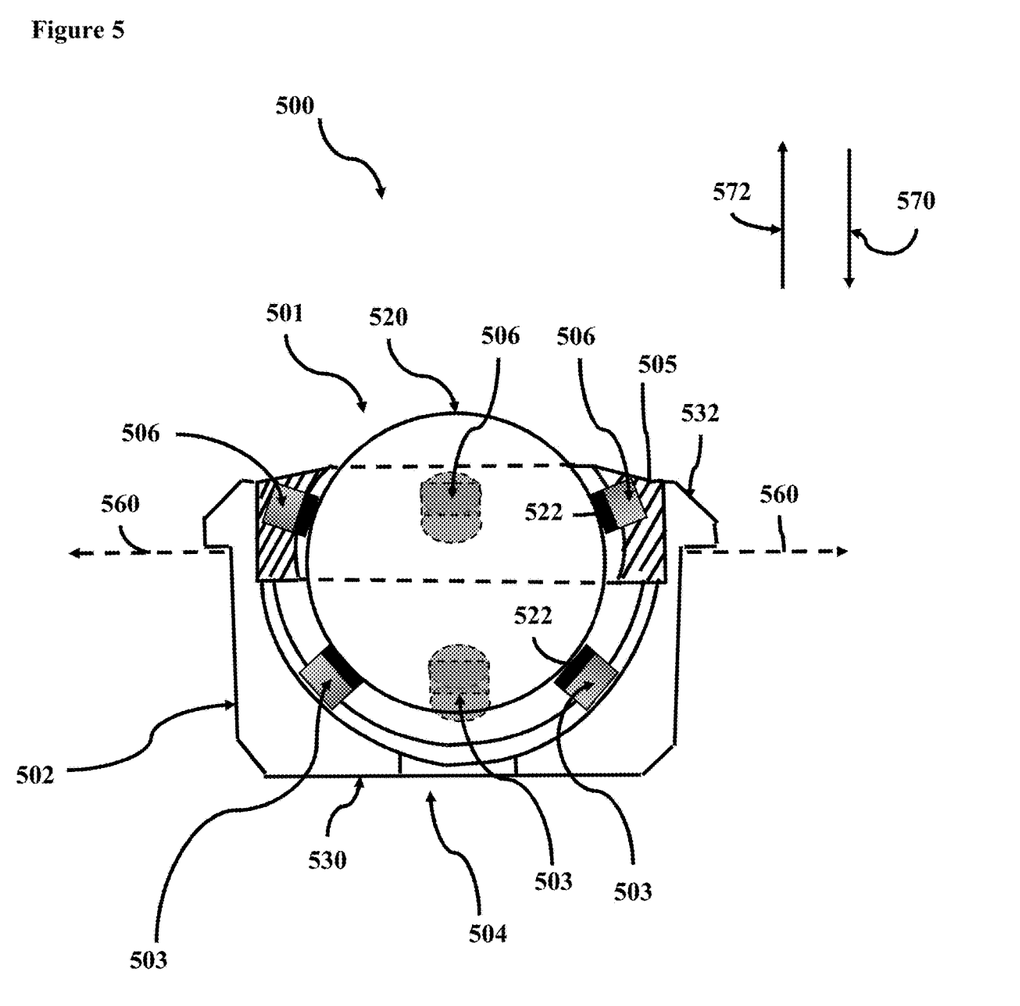
FIG. 5 is a side view of an alternative embodiment of the technology of this application.

FIG. 5 shows a side view of roller ball assembly 500, exemplifying an alternative embodiment of the technology of this application. In assembly 500, roller ball 501 is supported by support elements 503 (formed of superhard material) that are positioned within cup 502 and is further retained by retention elements 506 (formed of superhard material) deployed, positioned, and arranged on or within cap 505 such that opposing engagement surfaces 522 of both support elements 503 and retention element 506 are engaged with outer surface 520 of roller ball 501.

Retention elements 506 may be coupled to, with, or within cap 505 in the same manners as described with respect to the coupling of support elements with the cup. In certain aspects, retention elements 506 are of the same or substantially structure the same as support elements 503. As is evident in FIG. 5, support elements 503 are positioned below a hypothetical axis of rotation 560 of roller ball 501 to support downward force 570 of roller ball 501, and retention elements 506 are positioned above the hypothetical axis of rotation 560 of roller ball 501 to support upward force 572 of roller ball 501.

As with other embodiments, assembly 500 includes debris clearance hole 504 positioned at the bottom end 530 of cup 502.

Figure 6:
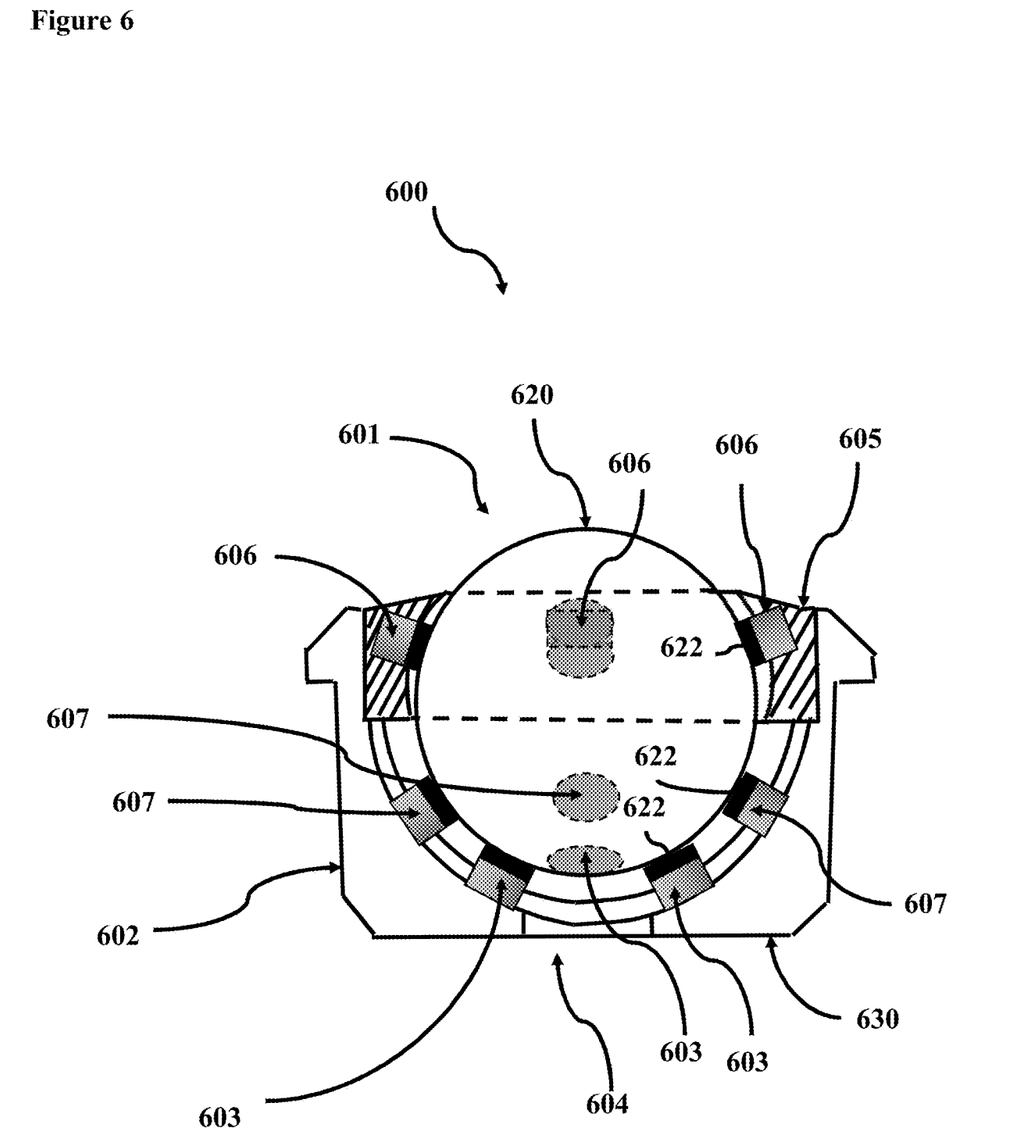
FIG. 6 is a side view of an alternative embodiment of the technology of this application.

FIG. 6 depicts a side view of roller ball assembly 600 in accordance with an alternative embodiment of the technology of this application. In assembly 600, roller ball 601 is supported by support elements 603 and additional support elements 607, each formed of superhard material and positioned within cup 602; and is retained by retention elements 606, which is formed of superhard material and is deployed and positioned in cap 605. Debris clearance hole 604 is deployed at the bottom end 630 of cup 602. Each of support elements 603, additional support elements 607, and retention elements 606 has an engagement surface 622 in sliding contact with outer surface 620 of roller ball 601.

Cup Assembly with Cut Out Relief and Lubricating Element

Figure 7A:
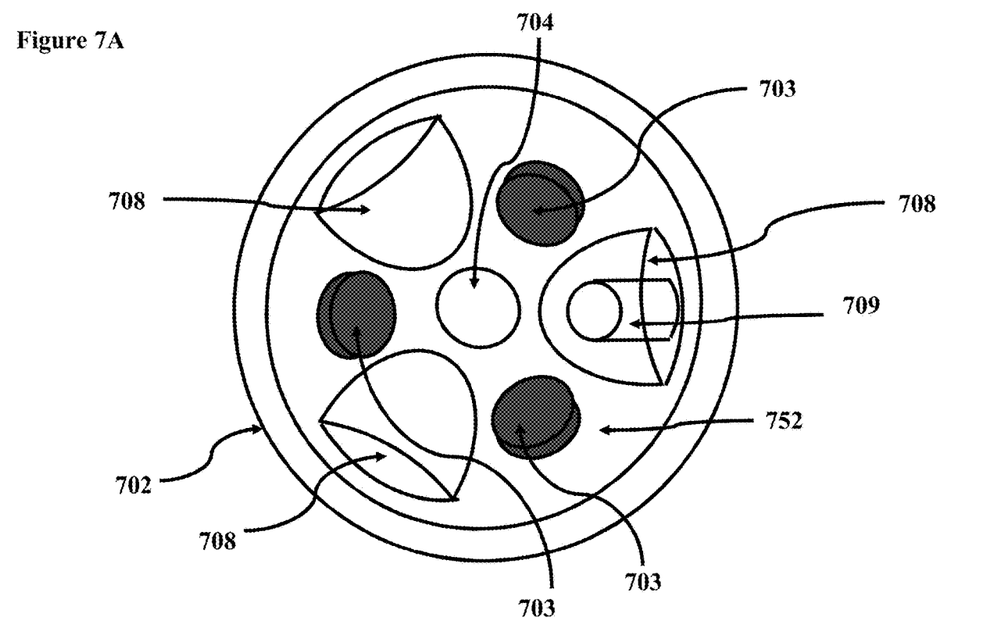
FIG. 7A is a top view of an alternative embodiment of the technology of this application without roller ball or cap.

FIG. 7A is a top view of cup 702 including a three-support element assembly (i.e., three support elements, 703) in accordance with certain aspects of the present technology.

Cup 702 is shown without a roller ball engaged therein and without a cap engaged thereon.

Support elements 703, formed of superhard material, are deployed and positioned in cup 702. Debris clearance hole 704 is formed through the bottom of cup 702, through cavity surface 752.

Cup 702 includes cut out relief areas 708 formed therethrough (e.g., through the frame, body, structure). Support elements 703 are positioned between cut out relief areas 708. Cut out relief areas 708 may be holes formed through cavity surface 752 and may allow debris to pass there-through.

Cup 702 also includes lubricating element 709 positioned to provide a lubricant within cup 702, between cup 702 and any roller ball that is positioned therein, such as between engagement surfaces of support elements 703 and the outer surface of a roller ball.

Figure 7B:
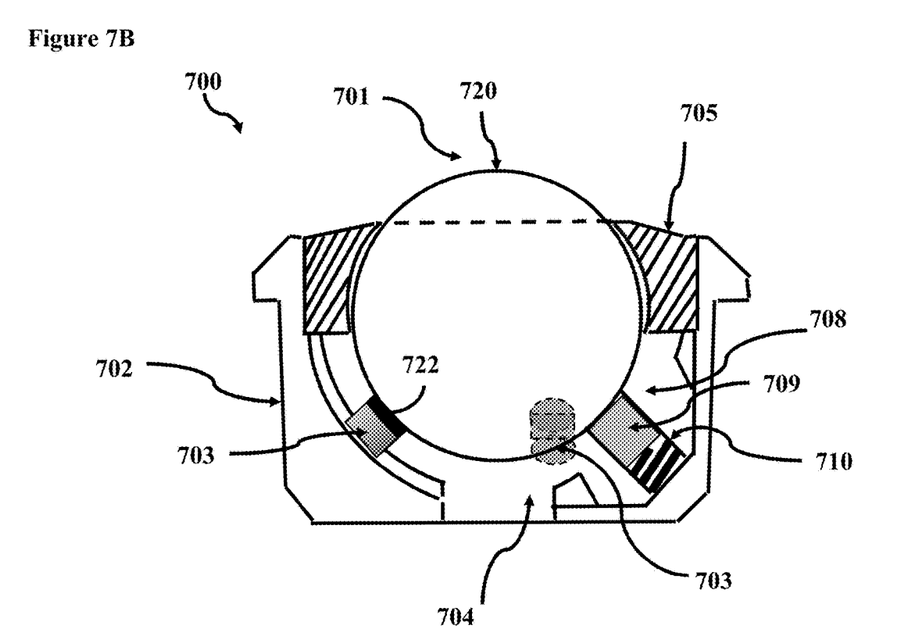
FIG. 7B is a side view of the assembly of FIG. 7A with cap and roller ball included.

FIG. 7B shows a side view of roller ball assembly 700, which includes cup 702 with support elements 703, debris clearance hole 704, cut out relief areas 708, and lubricating element 709 as shown in FIG. 7A, with the addition of primary roller ball 701 and cap 705 (retaining cap).

In assembly 700, roller ball 701 is supported within cup 702 via support elements 703, which are formed of superhard material, and is retained within cup 702 via cap 705. In operation, as roller ball 701 rolls in sliding contact with engagement surface 722 within cup 702, relief areas 708 and hole 704 allow for debris fall out there-through.

Lubricating element 709 is engaged with (e.g., pressed against) outer surface 720 of primary roller ball 701. Energizer 710, which may be a bias member, such as a spring, presses lubricating element 709 into engagement with outer surface 720 of roller ball 701. Thus, lubricating element 709 is positioned to apply lubricant to outer surface 720 of roller ball 701. In some aspects, the lubricant is any one of a number of solid lubricants including but not limited to: graphite, hexagonal boron nitride, oil releasing polymer, molybdenum disulfide, or tungsten disulfide. In some aspects, energizer 710 is a coil spring, a Belleville spring, an elastomer, or other applicable energizing element.

Although FIGS. 7A and 7B show cap 705 without superhard retention elements, it would be clear to one skilled in the art that a cap containing superhard retention elements, such as shown in FIGS. 5 and 6, could be used in the assembly of FIGS. 7A and 7B.

Positioning of Superhard Supporting Elements

Figure 8:
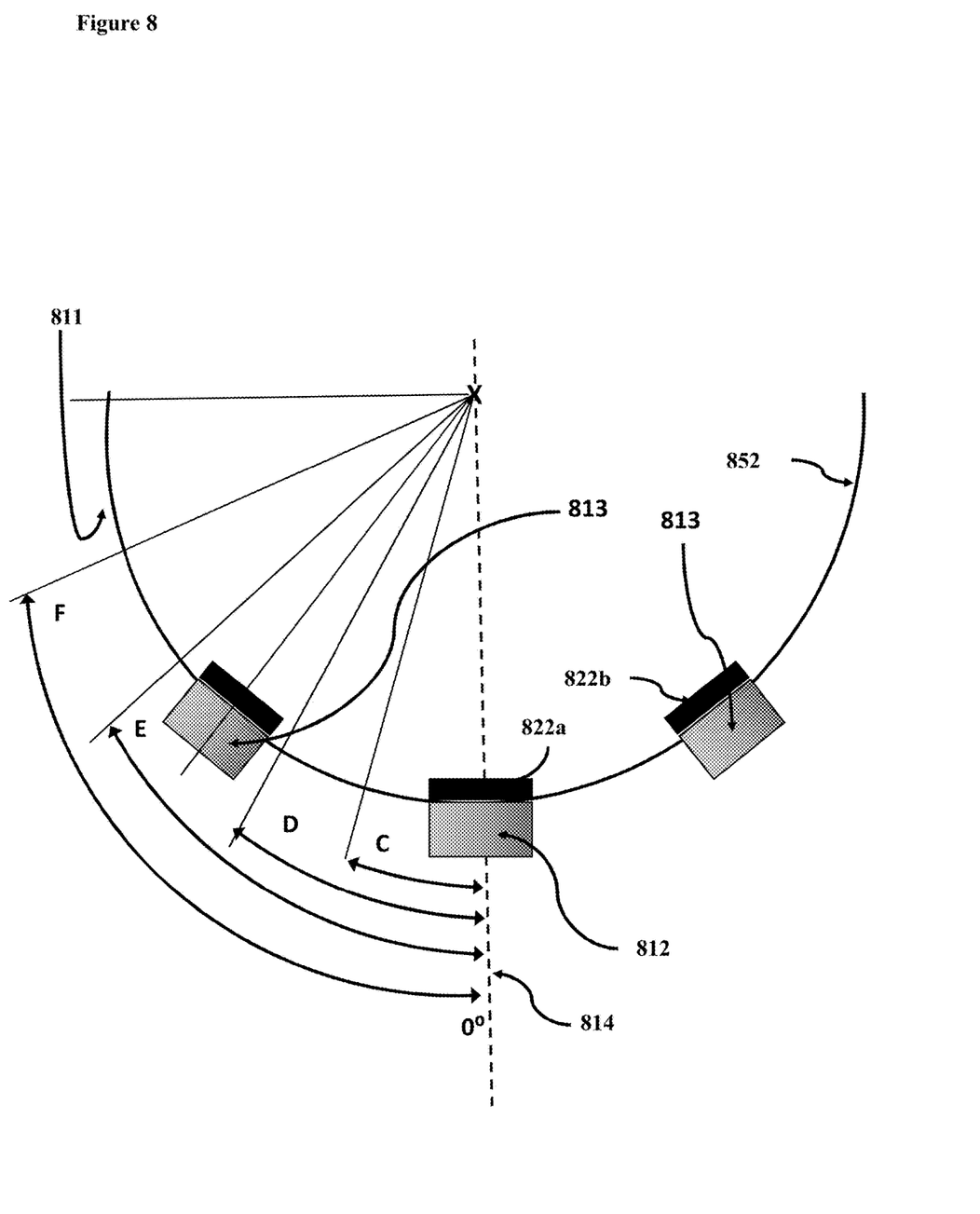
FIG. 8 is a diagram showing the location spectrum from centerline for a single support at centerline, or for multiple supports angled upwards on the cup from centerline.

FIG. 8 is a representative diagram of an arc 811 identifying positions where supporting elements of superhard material may be deployed within a cup in accordance with certain aspects of the technology of the present application. Arc 811 is bisected by vertical centerline 814. Arc 811 corresponds with the bottom, cavity surface of a cup of a roller ball assembly, as indicated via 852. Thus, centerline 814 corresponds with the centerline of a cup of a roller ball assembly or with the centerline of the roller ball of a roller ball assembly.

In embodiments where a single support element formed of superhard material is deployed, support element 812 is deployed as the support element at the base of arc 811 with the face 822a (engagement surface formed of superhard material) arranged and positioned perpendicular to centerline 814.

In embodiments where more than one support element formed of superhard material are deployed, support elements 813 (formed of superhard material) are deployed at positions that are generally equidistant from centerline 814 and at an arc angle from centerline 814 along arc 811. A generally minimum angle for deployment of multiple superhard support elements is shown at C. The value for angle C is about 20° from centerline 814. A more preferred spectrum of angles for deployment of superhard support elements is shown by angles D and E, which are from about 30° at D to about 50° at E, both from centerline 814. A generally maximum angle for deployment of multiple superhard support port elements is shown at F. The value for angle F is about 60° from centerline 814. It would be understood by those skilled in the art that the angles shown in FIG. 8 apply to the primary superhard support elements and do not apply to additional superhard retention elements that may be deployed in a retaining cap or ring of a roller ball assembly.

Roller Ball

In the practice of the technology of this application, the primary roller ball is preferably stainless steel or hard carbon steel, but may, alternatively, be tungsten carbide, silicon carbide, silicon nitride, alternative ceramics, nylon or any other bearing ball material as known in the art.

Support of the Roller Ball

Although superhard components are typically more expensive (financially) than existing small diameter support roller balls, the technology of the present application offers clear advantages over existing primary roller ball supports. The roller ball assembly technology of the present application includes, in some instances, only a single moving part, i.e., the primary roller ball, with no other moving parts in the roller ball assembly. The engagement of the primary roller ball with the superhard components (support and retention elements), especially polished PDC elements, provides for very low-friction rolling of the primary roller ball. In some aspects, the coefficient of friction (CoF) of the engagement between the primary roller ball and the PDC elements remains constant or substantially constant over relatively long terms of use, as the assembly does not rely on use of small roller balls (e.g., as shown in FIG. 1), which are subject to degradation that affects the CoF. The superhard components are also capable of higher loading than existing small diameter support roller balls.

Retaining Cap

In the embodiments disclosed herein, the retaining caps or rings (e.g., cap 205) may be held in place on the respective cup of the roller ball assembly via methods known in the art including, but not limited to, one or more snap rings, gluing, threading, welding, brazing, or press fitting the cap or ring to the cup. In some aspects, the retaining cap is designed to incorporate a debris excluding "knife edge", as is known in the art, or a sealing surface. Alternatively, the retaining cap or ring may be slotted, scalloped or gapped to allow for the free flow of fluid, such as in a downhole application of the roller ball assembly.

Mounting of Support and Retention Elements

The superhard support and retention elements deployed in the various embodiments of the technology of this application may be mounted (e.g., onto the cup and/or cap) via one or more methods, as known in the art, including but not limited to brazing, gluing, threading, or press fitting the superhard support and retention elements to the cap or cup.

Superhard Materials

Although the technology of this application is broad enough to include the use of a range of superhard materials, in some applications the preferred superhard material is PDC. While polished PDC is preferred in the technology of the present application, the PDC employed in this technology may be lapped, highly lapped, polished, or highly polished. U.S. Pat. Nos. 5,447,208 and 5,653,300, to Lund et al., provide disclosure related to PDC and the surface finish thereof. The disclosures of U.S. Pat. Nos. 5,447,208 and 5,653,300 are incorporated herein by reference and made a part of the present disclosure. As used herein, a surface is defined as "highly lapped" if the surface has a surface finish of 20 μin or about 20 μin, such as a surface finish ranging from about 18 to about 22 μm. As used herein, a surface is defined as "polished" if the surface has a surface finish of less than about 10 μm, or of from about 2 to about 10 μin. As used herein, a surface is defined as "highly polished" if the surface has a surface finish of less than about 2 μm, or from about 0.5 μm to less than about 2 μm. In some aspects, engagement surface has a surface finish ranging from 0.5 μin to 40 μin, or from 2 μm to 30 μin, or from 5 μin to 20 μm, or from 8 μin to 15 μm, or any range therebetween. In some aspects, engagement surface has a surface finish of less than 40 μm, less than 30 μm, less than 20 μm, less than 15 μm, less than 10 μm, less than 8 μin, less than 5 μm, or less than 2 μm. Polycrystalline diamond that has been polished to a surface finish of 0.5 μm has a coefficient of friction that is about half of standard lapped polycrystalline diamond with a surface finish of 20-40 μm.

Thus, in some aspects, the technology disclosed herein incorporates the use of superhard elements, preferably polished polycrystalline diamond compact (PDC) elements, to support the primary roller ball of a roller ball assembly. Arrangement and Configuration of Superhard Support and/ or Retention Elements In one preferred embodiment, three planar superhard support elements are complimentarily deployed in a metal cup or frame. In operation, the superhard support elements provide the primary support for the roller ball. Several alternatives are possible for the supporting elements of the technology of this application including an increased or decreased number of superhard support elements. For example, a single superhard support element may be deployed in the bottom of the metal cup to support the roller ball.

Although planar superhard support elements are preferred, non-planar, including concave or convex, superhard support elements may be used.

The upper girth of the roller ball may be contained (retained) by a number of materials or combinations of materials as known in the art including, but not limited to, polypropylene, Kevlar, metal, felt, leather, or Teflon. However, in an enhanced embodiment, the upper portion of the roller ball is contained (retained) by an additional set of superhard, preferably polished PDC elements (i.e., retention elements), secured on an inner surface or bosses of a cap of metal or other appropriate material.

The superhard components (support or retention elements) of the present technology may generally be as small as ⅛" (about 3 mm) in diameter or as large as ¾" (about 19 mm) in diameter. For smaller precision applications, significantly smaller diameter support and retention elements and smaller primary ball diameters may be used. As would be understood by one skilled in the art, the technology of the present application may be scaled up or down without departing from the primary technology. When two or more superhard components are used to support the transfer roller ball, the superhard components are typically, although not necessarily, located equidistant from the assembly centerline (as shown and described with reference to FIG. 8).

As would be understood by one skilled in the art, the various aspects disclosed herein may be combined in any of numerous combinations without departing from the scope of this disclosure. For example, a roller ball assembly that includes a primary roller ball supported on at least one support element that is formed of a superhard material may further include: at least one retention element formed of a superhard material; at least one additional support element formed of a superhard material; at least one large debris clearance hole; at least one lubricating element; or any combination thereof.

From the descriptions and figures provided above it can readily be understood that the technology of the present application may be employed in a broad spectrum of applications, including those in downhole environments. The technology provided herein additionally has broad application to other industrial applications.

Furthermore, while shown and described in relation to engagement between the surface of a roller ball and the surface of a support element that includes superhard material, one skilled in the art would understand that the present disclosure is not limited to this particular application and that the concepts disclosed herein may be applied to the engagement between any surface (e.g., steel surface) that is engaged with the surface of a superhard material.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A roller ball assembly comprising:
   a primary roller ball having an outer surface that comprises a metal;
   a cup defining a cavity;
   a support element, wherein the support element has an engagement surface that comprises a superhard material, and wherein the support element is positioned in and coupled with the cup;
   wherein the primary roller ball is positioned within the cavity of the cup and is supported by the support element such that the outer surface that comprises the metal is in sliding contact with the engagement surface that comprises the superhard material.

2. The roller ball assembly of claim 1, wherein the superhard material is at least as hard as tungsten carbide.

3. The roller ball assembly of claim 1, wherein the superhard material comprises tungsten carbide, silicon carbide, or cubic boron nitride.

4. The roller ball assembly of claim 1, wherein the superhard material comprises polycrystalline diamond.

5. The roller ball assembly of claim 4, wherein the polycrystalline diamond, at the engagement surface of the support element, is highly lapped, polished, or highly polished.

6. The roller ball assembly of claim 5, wherein the polycrystalline diamond, at the engagement surface of the support element, has a surface finish that is equal to or less than 20 μin.

7. The roller ball assembly of claim 1, wherein the primary roller ball is not in contact with the cup.

8. The roller ball assembly of claim 1, further comprising a cap coupled with the cup, wherein the cap is positioned to retain the primary roller ball within the cup.

9. The roller ball assembly of claim 8, further comprising a retention element coupled with the cap, wherein the retention element has an engagement surface that is engaged with the outer surface of the primary roller ball such that the primary roller ball is supported within the cup by the support element and is retained within the cup by the retention element, wherein the engagement surface of the retention element comprises a superhard material.

10. The roller ball assembly of claim 9, wherein the support element is positioned below an axis of rotation of the primary roller ball and wherein the retention element is positioned above the axis of rotation of the primary roller ball.

11. The roller ball assembly of claim 1, further comprising cut out relief areas formed through a bottom end of the cup.

12. The roller ball assembly of claim 11, wherein multiple support elements are positioned in and coupled with the cup, wherein each cut out relief area is positioned between two of the support elements, and wherein the support elements are positioned at the bottom end of the cup.

13. The roller ball assembly of claim 1, further comprising a lubricating element positioned relative to the cup to provide a lubricant between the cup and the primary roller ball.

14. The roller ball assembly of claim 13, further comprising an energizer positioned to force the lubricating element to engage with the outer surface of the primary roller ball to apply the lubricant to the outer surface of the primary roller ball.

15. The roller ball assembly of claim 1, wherein the support element is the only, single support element of the roller ball assembly.

16. The roller ball assembly of claim 15, wherein the support element is positioned at a base of the cup and is centered along a centerline of the primary roller ball.

17. The roller ball assembly of claim 1, wherein the roller ball assembly includes multiple support elements, including the support element and a second support element.

18. The roller ball assembly of claim 17, wherein the multiple support elements are positioned along a base of the cup at positions that are equidistant from a centerline of the primary roller ball and at arc angles from the centerline of the primary roller ball.

19. The roller ball assembly of claim 18, wherein the multiple support elements are positioned at arc angles of at least 20° and at most 60° from the centerline.

20. The roller ball assembly of claim 1, further comprising a debris clearance hole positioned at a bottom end of the cup.

21. The roller ball assembly of claim 1, wherein the roller ball assembly include a single moving part, and wherein the single moving part is the primary roller ball.

22. The roller ball assembly of claim 1, wherein the primary roller ball has an axis of rotation defined by rolling movement relative to the support element, wherein the support element has the engagement surface that engages the primary roller ball along a contact area, wherein any imaginary line extending perpendicular to the contact area is at an angle relative to the axis of rotation.

23. The roller ball assembly of claim 1, wherein the support element is static relative to the cup.

24. The roller ball assembly of claim 1, wherein the outer surface comprises steel and the engagement surface comprises polycrystalline diamond.

25. The roller ball assembly of claim 24, wherein the steel comprises stainless steel.

26. The roller ball assembly of claim 24, wherein the steel comprises high-carbon steel.

27. A roller ball assembly, the roller ball assembly comprising:
a primary roller ball having an outer surface that comprises a steel;
a cup body defining a cavity; and
a plurality of support elements positioned in the cavity and coupled with the cup body, wherein each support element has an engagement surface that comprises a superhard material comprising polycrystalline diamond, and wherein the plurality of support elements are static relative to the cup body;
wherein the primary roller ball is positioned within the cup body and supported by the support elements such that the outer surface that comprises the steel is in sliding contact with the engagement surface that comprises the polycrystalline diamond.

28. The cup of claim 27, further comprising a cap coupled with the cup body, wherein the cap is positioned to retain the primary roller ball within the cavity.

29. The cup of claim 27, further comprising cut out relief areas formed through a bottom end of the cup body.

30. The cup of claim 27, further comprising a lubricating element positioned in the cup body.

31. The cup of claim 27, further comprising a debris clearance hole positioned at a bottom end of the cup body.

32. A method of supporting a primary roller ball of a roller ball assembly, the method comprising:
positioning a support element within a cavity of a cup, wherein the support element has an engagement surface that comprises a superhard material;
positioning the primary roller ball within the cavity such that an outer surface of the primary roller ball is in contact with the engagement surface of the support element, wherein the outer surface of the primary roller ball comprises a metal; and
positioning a cap relative to the cup such that the cap is positioned to retain the primary roller ball within the cavity.

33. The method of claim 32, further comprising cutting out relief areas through a bottom end of the cup.

34. The method of claim 32, further comprising lubricating engagement between the engagement surface of the support element and the outer surface of the primary roller ball.

35. The method of claim 32, further comprising removing debris from the roller ball assembly through a debris clearance hole positioned at a bottom end of the cup.

36. The method of claim 32, wherein the superhard material comprises polycrystalline diamond.

37. The method of claim 36, further comprising highly lapping, polishing, or highly polishing the polycrystalline diamond at the engagement surface of the support element.

38. The method of claim 36, further comprising providing the polycrystalline diamond, at the engagement surface of the support element, with a surface finish that is equal to or less than 20 μin.

39. The method of claim 32, further comprising positioning a retention element on the cap, wherein the retention element has an engagement surface that comprises a superhard material, and wherein the retention element is positioned such that the engagement surface of the retention element is in contact with the outer surface of the primary roller ball to retain the primary roller ball within the cavity.

40. The method of claim 32, wherein the support element is positioned at a base of the cup and is centered along a centerline of the primary roller ball.

41. The method of claim 32, wherein the method includes supporting the primary roller ball with multiple support elements including the support element and a second support element, and wherein each of the multiple support elements is positioned along a base of the cup at positions that are equidistant from a centerline of the primary roller ball and at arc angles from the centerline of the primary roller ball.

42. The method of claim 41, wherein the multiple support elements are positioned at arc angles of at least 20° and at most 60° from the centerline.

43. An assembly comprising:
a primary roller ball having an engagement surface that comprises metal or ceramic;
a cup; and
a support element having an opposing engagement surface, the opposing engagement surface comprising superhard material, wherein the support element is positioned within and coupled with the cup;
wherein the primary roller ball is positioned within the cup and supported on the support element such that the engagement surface is movingly engaged with the opposing engagement surface.

44. The assembly of claim 43, wherein the engagement surface comprises steel, tungsten carbide, silicon carbide, or silicon nitride.

45. The assembly of claim 43, wherein the superhard material includes at least some tungsten carbide, silicon carbide, or cubic boron nitride.

46. The assembly of claim 43, wherein the superhard material includes at least some polycrystalline diamond.

47. The assembly of claim 46, wherein the polycrystalline diamond, at the opposing engagement surface, has a surface finish that is equal to or less than 20 μin.

* * * * *

UNITED STATES PATENT AND TRADEMARK OFFICE
CERTIFICATE OF CORRECTION

| | |
|---|---|
| PATENT NO. | : 11,014,759 B2 |
| APPLICATION NO. | : 16/049631 |
| DATED | : May 25, 2021 |
| INVENTOR(S) | : David P. Miess et al. |

It is certified that error appears in the above-identified patent and that said Letters Patent is hereby corrected as shown below:

In the Claims
Column 11, Line 57, delete "include" and insert --includes--.
Column 12, Line 21, delete "surface that comprises" and insert --surfaces that comprise--.
Column 12, Line 24, delete "cup" and insert --roller ball assembly--.
Column 12, Line 27, delete "cup" and insert --roller ball assembly--.
Column 12, Line 29, delete "cup" and insert --roller ball assembly--.
Column 12, Line 31, delete "cup" and insert --roller ball assembly--.

Signed and Sealed this
Twenty-eighth Day of March, 2023

Katherine Kelly Vidal
*Director of the United States Patent and Trademark Office*